Figure 1:
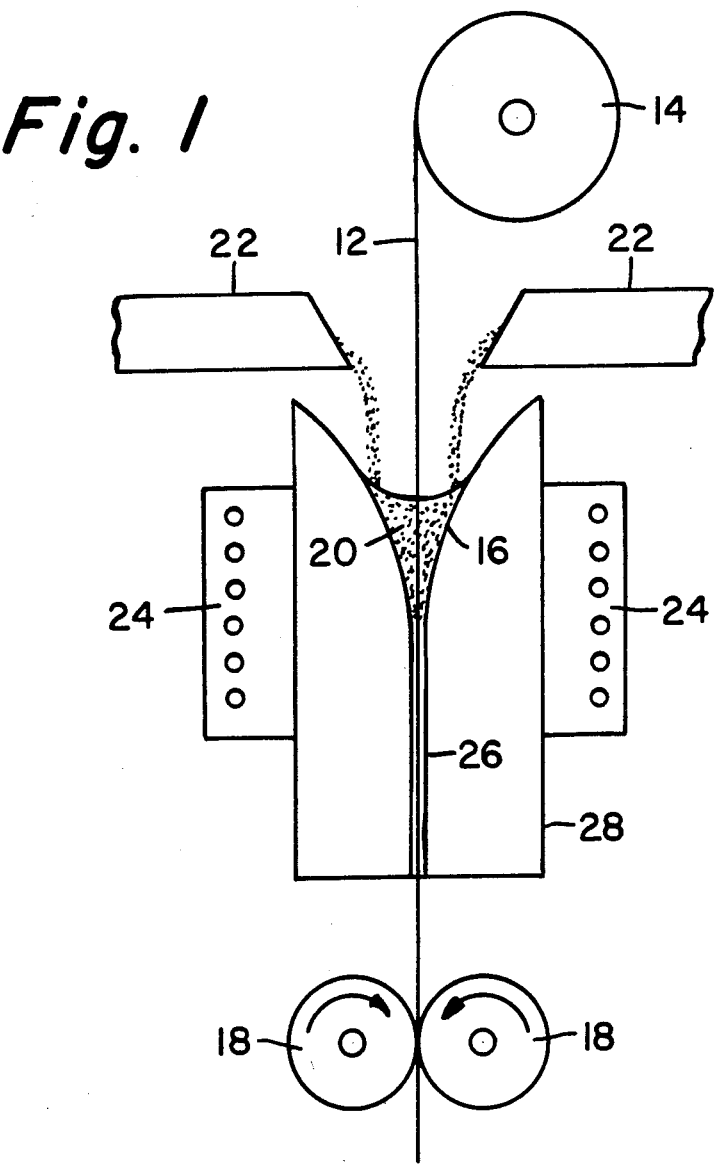

United States Patent [19]

Allaire et al.

[11] Patent Number: 4,752,313

[45] Date of Patent: Jun. 21, 1988

[54] PULTRUSION PROCESS FOR FIBER-REINFORCED COMPOSITES

[75] Inventors: Roger A. Allaire, Big Flats; William P. Ryszytiwskyj; Robert V. VanDewoestine, both of Corning, all of N.Y.

[73] Assignee: Corning Glass Works, Corning, N.Y.

[21] Appl. No.: 942,281

[22] Filed: Dec. 16, 1986

[51] Int. Cl.[4] .............................. C08B 19/09
[52] U.S. Cl. ..................... 65/18.1; 427/376.2; 427/434.7; 156/89; 65/18.4; 65/60.5; 65/60.53; 65/183
[58] Field of Search ............ 427/356, 376.2, 434.2, 427/434.7, 443.2; 118/243.4, DIG. 18, DIG. 20; 65/183, 60.5, 60.53, 18.1, 18.4; 156/89

[56] References Cited

U.S. PATENT DOCUMENTS

| | | | |
|---|---|---|---|
| 4,249,925 | 2/1981 | Kawashima et al. | 65/60.53 |
| 4,265,968 | 5/1981 | Prewo | 428/336 |
| 4,341,826 | 7/1982 | Prewo et al. | 156/89 |
| 4,353,966 | 10/1982 | Snetzer et al. | 156/89 |
| 4,460,638 | 7/1984 | Haluska | 156/89 |
| 4,617,041 | 10/1986 | Meerman | 65/18.1 |
| 4,664,731 | 5/1987 | Layden et al. | 65/18.1 |

Primary Examiner—Thurman K. Page
Assistant Examiner—L. R. Horne
Attorney, Agent, or Firm—C. S. Janes, Jr.

[57] ABSTRACT

There is disclosed a method of producing an elongated, fiber-reinforced composite having a glass or glass-ceramic matrix and an elongated axial form. A continuous length of fibers is impregnated with glass and the impregnated fiber body consolidated by being pultruded through a die. A combination of axial tension to pultrude the fiber body and sintering pressures exerted by the die result in a composite body of continuous length.

13 Claims, 2 Drawing Sheets

PULTRUSION PROCESS FOR FIBER-REINFORCED COMPOSITES

RELATED APPLICATION

A companion application, Ser. No. 942,242 and entitled "Method of Forming a Fiber-Reinforced, Inorganic Composite", is being filed of even date herewith. That application (Allaire) discloses and claims an alternate method of producing a fiber-reinforced composite having a glass or glass-ceramic matrix and a high axial form. The method comprises impregnating a plurality of tows, or other continuous lengths, of fibers with glass, weaving the several lengths into an elongated network wherein fibers cross each other at an angle to the axis network, thermally softening the impregnating glass, applying an axial tension to the woven network whereby the crossed fibers create a pressure between them, pultruding the composite through a shaping die and cooling.

BACKGROUND OF THE INVENTION

The invention is concerned with the production of fiber-reinforced composites having a glass or glass-ceramic matrix. It is particularly concerned with forming elongated composite bodies, such as rods, tubes, or sheets, that have a uniform cross-section along one axis.

A fiber-reinforced composite comprises a matrix having reinforcing fibers embedded in and bonded to the matrix. Such composites are of great interest in many applications, since they may provide substantially greater mechanical strength and/or toughness than the matrix alone. Commercial activity thus far has largely involved glass fiber reinforced composites having an organic polymer or metal matrix. More recently, however, composites employing glass or glass-ceramic matrices have been receiving attention, particularly for high temperature environments.

LITERATURE

Pulling or drawing a continuous length of an inorganic material from a molten pool is a well known production technique. For example, it is an age old practice to draw either sheet or tubular glass.

In recent years, this technique has been adapted to the forming of fiber-reinforced rods, as disclosed in U. S. Pat. No. 4,296,060 and patents mentioned therein. These disclosures, however, are concerned only with forming fiber-reinforced organic polymers by drawing a resin-impregnated set of fibers through a shaping die. This is a relatively low-temperature operation.

The production of glass or glass-ceramic composite materials, having flexural strengths up to and in excess of 100,000 psi, plus excellent toughness, has been reported. These materials are said to employ either silicon carbide or graphite fibers in a matrix of glass or glass-ceramic. The materials, as well as their production by hot pressing, are described, for example, in U.S. Pat. Nos. 4,485,179 (Brennan et al.), 4,511,663 (Taylor), 4,588,699 (Brennan et al.) and 4,589,900 (Brennan et al.).

PURPOSE OF THE INVENTION

Hot pressing has proven to be a reasonably successful means of producing fiber-reinforced, glass or glass-ceramic composites wherein the length and width of a body are relative similar. However, it has not been adapted to production to continuous or elongated forms, such as ribbons or rods, having a high axial form. Nor has a successful alternative been available.

A main purpose, then, is to provide fiber-reinforced glass or glass-ceramic composites in continuous or elongate form.

A further purpose is to provide a practical production method for such composites.

Another purpose is to provide a production method adapted to continuous production.

A still further purpose is to provide a commercially feasible method of producing fiber-reinforced, glass or glass-ceramic composites in elongate form.

A particular purpose is to adapt the pultrusion procedure, as used in production of organic polymer matrix bodies, to the production of glass or glass-ceramic matrix, composite bodies in elongate form.

STATEMENT OF THE INVENTION

Pursuant to these and other apparent purposes, our invention is a method of producing, in elongate form, a fiber-reinforced composite having a glass or glass-ceramic matrix and a uniform cross-section along one axis which comprises:

impregnating a continuous length of fibers with glass;

introducing the length of glass-impregnated fibers into a furnace chamber having a forming die through which the fibers pass;

applying to the length of impregnated fibers a force of axial tension in conjunction with sintering pressures exerted by the die to bond the glass and fibers into a shaped composite body;

pultruding the composite thus formed from the die;

cooling the composite to a solid before it reaches the source of the pultruding force.

In a preferred embodiment, the continuous length of fibers is impregnated with a slurry of finely-divided glass to form a prepreg which is then heated and pultruded through a forming die.

GENERAL DESCRIPTION

The invention provides a method of producing glass or glass-ceramic composites in elongated shapes such as ribbons, or rods. Unitary materials, such as glass, ceramics and plastics, are commonly extruded or rolled in elongate form. However, such techniques are not adaptable to composite formation, particularly where fiber alignment is desired.

It has been noted earlier that the technique of pultrusion has been used in forming fiber-reinforced, organic composites. These are composites with organic resin or polymer matrices. A key feature of our present invention is discovery that this forming technique can be adapted to produce fiber-reinforced composites having inorganic matrices, in particular a glass or glass-ceramic matrix.

Pultrusion is a procedure in which a continuous fiber reinforcement has axial tension applied to move it through a forming die in conjunction with a matrix material. The fibers and matrix are consolidated and shaped into a composite body during passage through the die. Penetration of the matrix about the fibers requires that the matrix be in a relatively fluid state. With an organic matrix, it is usually adequate to maintain the matrix at a temperature in the 200°–300° F. range.

Experience indicates, however, that a molten glass bath must be maintained at a viscosity not over 10 poise in order to satisfactorily impregnate a fiber tow passed through the bath. Special glasses that have a softening temperature on the order of 400° C. have been tested. However, they tend to volatilize to a considerable degree before the desired low viscosity can be reached and maintained. More stable glasses have much higher viscosity-temperature characteristics, and may require up to 1800° C. to reach the desired low viscosity. At these temperatures, fiber degradation can occur. Commercial development of this impregnating procedure therefore requires further development of specially adapted glasses and/or fiber protection.

The foregoing experience led to development of an alternative procedure wherein a fiber tow, cloth, or the like, was impregnated with a slurry of finely-divided glass in a separate operation.

In this procedure, the selected matrix glass is melted and then pulverized to an average particle size of ten microns or less. The glass is mixed with a suspending medium, a binder, wetting agent and other additives through the slurry to become impregnated. The impregnated fibers may then be dried and stored before further treatment. Alternatively, they may be passed directly into a heat chamber for treatment in accordance with the invention.

The glass matrix may be of any known composition. However, prior composite experience has shown optimum properties achieved with boro- or alumino-silicate glasses. If a glass-ceramic matrix is desired, an appropriate glass will be employed and subsequently crystallized.

The fiber-reinforcing material may be a plurality of fibers in a tow, or a ribbon. The fibers may be graphite or silicon carbide, as known in the reinforcing art. An inert, or reducing, atmosphere may be employd to protect the fibers or matrix if necessary.

The ratio of fibers-to-matrix will depend on the particular circumstances of any given application. Thus, it is contemplated that the elongated composite formed may contain as little as 10% or as much as 80% fibers. A value of 40-50% by volume is currently preferred.

THE DRAWING

Figure 3:
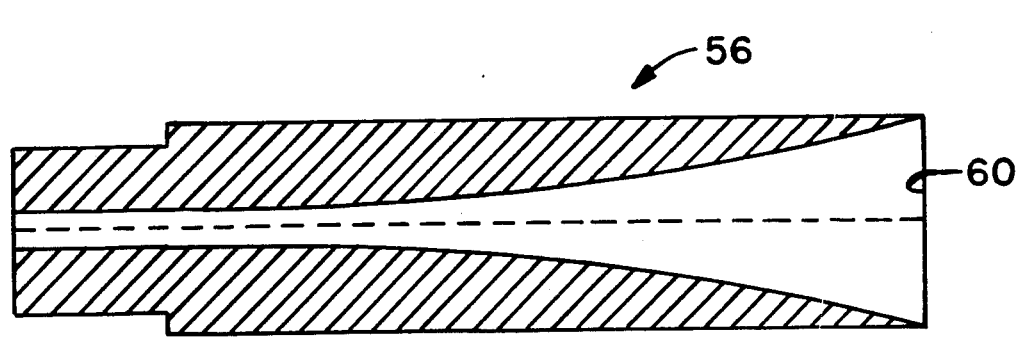
Figure 2A:
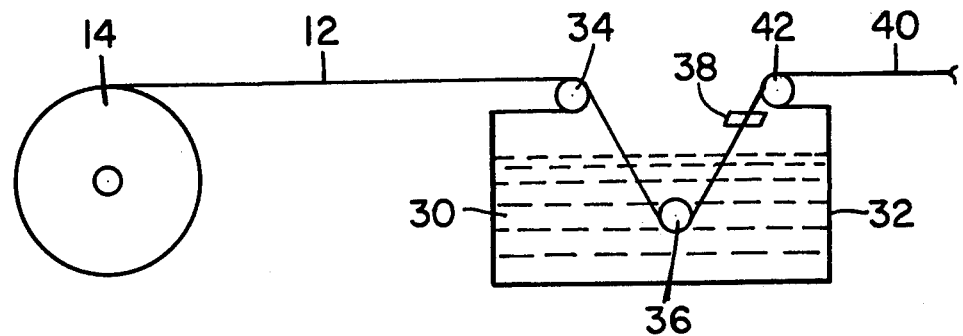
Figure 2B:
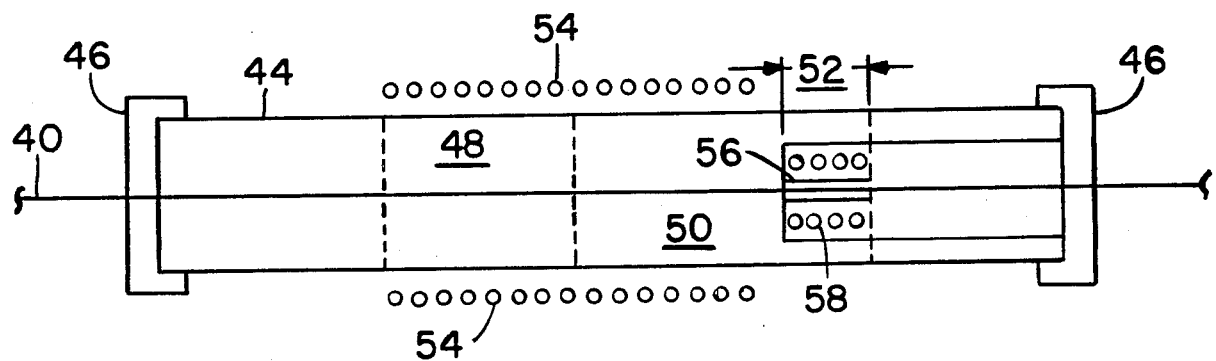

The invention is further described with respect to the accompanying drawing wherein:

FIG. 1 is a schematic side view illustrating a vertical down draw means for performing the invention;

FIG. 2a and 2b (the latter an extension of the former) are a schematic drawing of equipment adapted to perform the invention along a horizontal axis or plane;

FIG. 3 is an enlarged cross-sectional view of the die shown in FIG. 2.

FIG. 1 illustrates a vertical arrangement for pultrusion of an inorganic, fiber-reinforced, glass composite rod. A fiber reinforcement 12, in the form of a tow of several fibers, is drawn from a roll 14 through a heated die 16 by pulling rolls 18 located below die 16.

Matrix material 20, which may be a crushed glass, is fed into the top of die 16 from vibratory feeders 22. Heat is supplied by heaters 24 as tow 12 is drawn through the glass reservoir and becomes impregnated. Thus, the applied heat, together with die pressures, causes the glass to soften, and impregnate and bond to the fibers. The resulting composite is drawn from die 16 by the axial tension applied by pulling rolls 18.

The process involves an initial consolidation step as the glass and fiber are drawn through die 16. Passage through the die may be considered both a consolidating step and a forming step. Thus, the shape of the die determines the final shape of the elongated composite. After leaving the die exit, the formed composite, rod 26, is subjected to cooling means 28 so that it becomes solid before reaching pulling rolls 18.

A key factor is the ability of the combination matrix and fiber to withstand high axial tension. Consequently, very large sintering pressures can be achieved in the die. Typical pressures, necessary to sinter inorganic composites to high strength in hot presses, are 300–1500 pounds per square inch. Such pressures are easily reached in the present pultrusion process. Actually, it would be possible to achieve sintering pressures upwards of 50,000 psi if necessary. However, an arrangment of multiple pulling rolls, or other strong pulling force, might be necessary.

FIG. 2a illustrates a process wherein the fiber tow is impregnated with a glass slurry separately from consolidation. The impregnated tow, commonly referred to as a prepreg, may be used directly from impregnation (as shown), or may be dried and stored.

As in FIG. 1, a tow 12 may be drawn from a roll 14, but is passed through an impregnating bath 30 in vessel 32. Tow 12 passes over roll 34, into bath 30 and under roll 36. At this point, the tow is turned upward to pass through a die 38 which strips excess slurry from the tow. Then the impregnated tow 40 is pulled over roll 42 to resume a horizontal path.

It will be appreciated that a plurality of tows may be impregnated simultaneously, and then gathered in a bundle before entering the consolidating tube 44. In that case, die 38 might be a series of spaced die openings with one impregnated tow passing through each die opening. Likewise, roll 42 might be grooved. Then each tow passes through a separate groove, and the tows are maintained in ordered relation for gathering.

As shown in FIG. 2b, impregnated tow 40 is passed directly into a tubular furnace 44. The tube is provided with end caps 46 which permit maintaining a non-oxidizing atmosphere in the tube. An atmosphere inlet may be provided, for example, in an end cap to provide positive pressure.

Impregnated tow 40 may pass through a preheat zone 48, a primary heat zone 50, and a consolidation zone 52. Heaters 54, which may be separately controlled, maintain predetermined temperatures in each zone.

Zone 52 is characterized by the presence of forming die 56 which may have an auxiliary heater 58 for closer thermal control. The tow is consolidated into a composite in the die as described elsewhere, and leaves the die exit with the desired cross-section. The composite rod is now subjected to conventional cooling as it leaves the tube. It must become solid before reaching the pulling rolls.

It will be appreciated that, while the equipment shown in FIG. 1 is arranged to operate as a vertical downdraw, and that shown in FIG. 2 is arranged horizontally, the procedure illustrated in these FIGURES are not limited to such directional operation. For example, both the technique of FIG. 1, and that of FIG. 2, could be conducted in a vertical updraw apparatus. Thus, selection of direction may depend on availability of space in which to receive the consolidated product.

FIG. 3 shows, in cross-section, a typical forming die structure. As shown, die 56 has an opening 60 that gradually decreases in cross-section as one progresses along the axis of pull. Die 56 may be of a very hard material, such as boron carbide, and may be in sections to facilitate finishing. However, the sections must provide a converging wall surface and controlled cross-section reduction, and each section must blend smoothly into the adjacent one. As explained elsewhere, sintering pressures are exerted as impregnated tow is drawn through the die.

The invention is further described with reference to examples of currently preferred embodiments embodying graphite fibers and borosilicate glasses. This combination has provided the highest mechanical strengths in the final composite product.

TABLE 1 shows approximate compositions, in percent by weight as calculated on an oxide basis, of three glasses used as matrix glasses.

TABLE I

|  | A | B | C |
|---|---|---|---|
| $SiO_2$ | 79.8 | 60.9 | 56.7 |
| $B_2O_3$ | 14.2 | 28.9 | 5.3 |
| $Al_2O_3$ | 1.9 | 2.5 | 15.5 |
| CaO | — | — | 9.9 |
| MgO | — | — | 7.0 |
| BaO | — | — | 6.0 |
| $Na_2O$ | 4.1 | 7.5 | — |
| $As_2O_3$ | — | 0.2 | 0.4 |
| $Sb_2O_3$ | — | — | 0.2 |

Glasses A and B were used with graphite fiber tows, each tow being composed of 12,000 fibers and available under designation Hercules AS-4. Glass C was used with SiC fibers.

A group of eight tows was impregnated with an alcohol-based slurry in the manner illustrated in FIG. 2. This sluury may contain 20–60 weight percent glass crushed to an average particle size of about ten microns. The eight impregnated tows were drawn together into and through a tube furnace in which the impregnated tows were consolidated into a unitary, continuous, 0.125 inch diameter composite rod with 40–50 volume percent fiber loading.

In one trial, the impregnated tows were dried and stored before being drawn through the consolidated die. Alternatively, the tows wre subjected to one continuous draw through the slurry, into the tube furnace, and through the consolidating die. This is as illustrated in FIG. 2. Any differences in final properties appeared overshadowed by other factors.

TABLE 2 shows strengths of the composites produced with the glasses of TABLE 1. Strength is measured in thousands of lbs. per square inch (ksi) in a standard four point bending device. The TABLE also shows the thermal coefficients of expansion per °C. (Coef./°C.) for the composite between 0° and 300° C.

TABLE 2

| Glass | Strength (ksi) | Coef./°C. |
|---|---|---|
| A | 78 | $10 \times 10^{-7}$ |
| B | 90 | $7 \times 10^{-7}$ |
| C | 82 | $34 \times 10^{-7}$ |

I claim:

1. A method of producing an elongated, fiber-reinforced composite having a glass or glass-ceramic matrix and a uniform cross-section along one axis which comprises:
    impregnating a continuous length of fibers said fibers selected from the group consisting of silicon carbide and graphite fiber with glass;
    introducing the length of glass-impregnated fibers into a furnace chamber having a forming die through which the fibers pass;
    applying to the length of impregnated fibers a force of axial tension in conjunction with sintering pressures exerted by the die to bond the glass and fibers into a shaped composite body;
    pultruding the composite thus formed from the die;
    cooling the composite to a solid before it reaches the pultruding force.

2. A method in accordance with claim 1 wherein the continuous length of fibers is impregnated by drawing it vertically through a bed of finely-divided glass particles in which the glass particles are continuously softened to flow around and bond to the fibers.

3. A method in accordance with claim 1 wherein a plurality of continuous fibers are impregnated with a slurry of finely-divided glass particles to form a prepreg which is subjected to an axial pull by pulling rolls and to the sintering pressures of a heated forming die.

4. A method in accordance with claim 1 wherein the fibers are impregnated as a plurality of tows which are simultaneously drawn through the die to form a unitary composite body.

5. A method in accordance with claim 1 wherein the prepreg contains 10–80% by volume fibers.

6. A method in accordance with claim 5 wherein the prepreg contains at least 30% fibers.

7. A method in accordance with claim 1 wherein the prepreg is drawn through a heating chamber and a heated forming die mounted adjacent an exit opening of the heating chamber.

8. A method in accordance with claim 7 wherein the heating chamber atmosphere is non-oxidizing.

9. A method in accordance with claim 8 wherein the atmosphere is composed of nitrogen.

10. A method in accordance with claim 3 wherein the glass in the impregnating slurry has an average particle size not over about ten microns.

11. A method in accordance with claim 3 wherein the impregnating slurry contains an organic component which decomposes within an non-oxidizing atmosphere.

12. A method in accordance with claim 1 wherein the heated forming die is an elongated tube having a wall that converges from its entry end to its exit end.

13. A method in accordance with claim 1 wherein the glass matrix is capable of in situ crystallization, and the composite is subsequently treated to effect crystallization of the glass.

* * * * *

UNITED STATES PATENT AND TRADEMARK OFFICE
CERTIFICATE OF CORRECTION

PATENT NO. : 4,752,313

DATED : June 21, 1988

INVENTOR(S) : Roger A. Allaire et al

It is certified that error appears in the above-identified patent and that said Letters Patent is hereby corrected as shown below:

Column 1, line 6, change "942,242" to --942,282--.

Column 1, line 68, change "to" (second occurrence) to --of--.

Column 2, line 20, change "elongate" to --elongated--.

Column 3, lines 18 and 19, insert the following between "additives" and "through": --to form a slurry. The fibers may then be passed--.

Column 3, line 46, change "Fig." to --Figs.--.

Column 4, line 56, change "procedure" to --procedures--.

Column 5, line 27, insert "the" between "under" and "designation".

Column 5, line 40, change "wre" to --were--.

Column 5, line 47, change "(ksi) in" to --(ksi) on--.

Column 6, lines 5 and 6, insert "being" between "fibers" and "selected".

Signed and Sealed this

Seventeenth Day of January, 1989

Attest:

DONALD J. QUIGG

*Attesting Officer*    *Commissioner of Patents and Trademarks*